J. MARCH.
TOOL HOLDER.
APPLICATION FILED APR. 10, 1915.
1,175,283.
Patented Mar. 14, 1916.
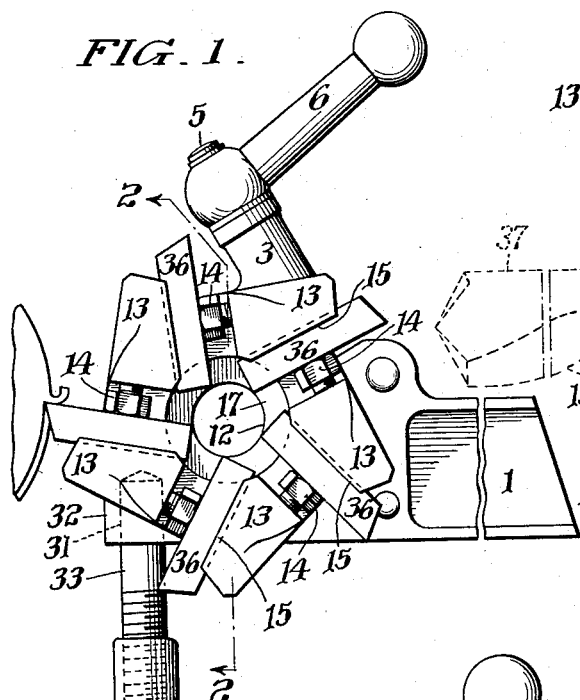
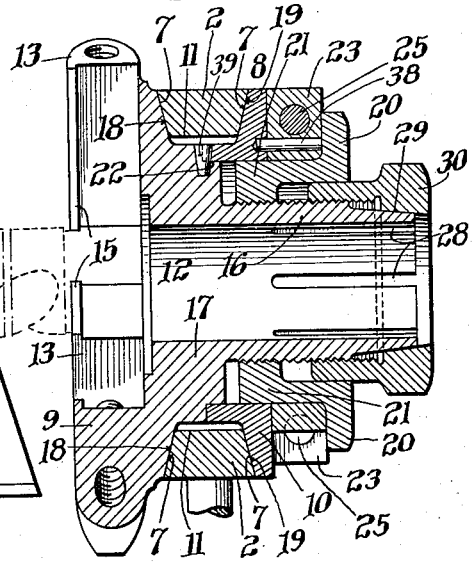
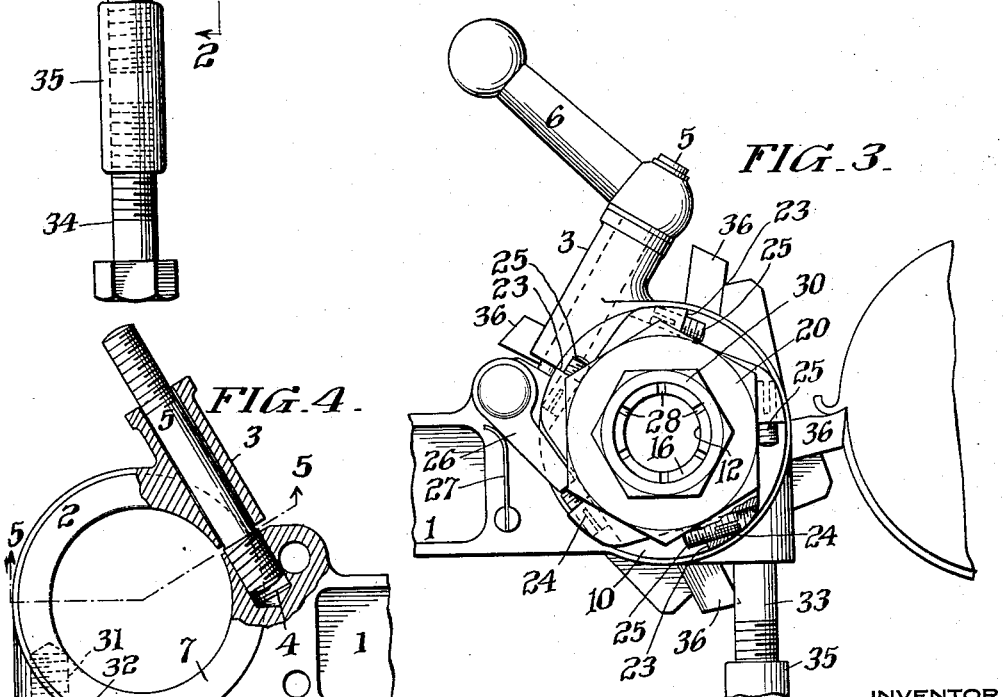
WITNESSES
Daniel Webster, Jr.
William Conway
INVENTOR
John March
BY Robert M. Barr
ATTORNEY

UNITED STATES PATENT OFFICE.

JOHN MARCH, OF PHILADELPHIA, PENNSYLVANIA.

TOOL-HOLDER.

1,175,283.   Specification of Letters Patent.   Patented Mar. 14, 1916.

Application filed April 10, 1915.   Serial No. 20,367.

*To all whom it may concern:*

Be it known that I, JOHN MARCH, a citizen of the United States, residing in Philadelphia, Pennsylvania, have invented certain new and useful Improvements in Tool-Holders, of which the following is a specification.

My invention relates to tool holders and more particularly to a holder of the turret type having provision for a number of tools each of which is adapted to perform a separate operation, such as cutting, roughing, finishing, boring or the like.

The object of the invention is to provide a holder forming a complete unitary device for the purpose intended, and serving as a separate unit adapted to be employed with lathes, shapers, planers or like machines without necessitating special equipment of the particular machine to set up the holder.

Another object of the invention is to provide a holder for a plurality of cutting tools mounted upon a rotatable head and having also provision for a relatively fixed tool such as a twist drill, boring bar, die holder or the like.

A further object is to provide an adjustable, rotatable head having a self-centering bearing part for engagement with a clamping device whereby the latter adjusts itself automatically and forms a positive means for retaining the head in operative relation.

A still further object is to provide a means for independently locking each tool in operative position so that each tool becomes a separate unit which may be adjusted, removed or replaced without interfering with or changing the adjustment of any other tool. In this connection means are also provided to prevent lateral displacement or shifting of the tool while it is cutting or performing a machining operation.

Another object is to provide a support operating in conjunction with the bed of the machine or other fixed part to steady the holder and eliminate vibration or chattering of the tool.

It further consists of other novel features of construction, all as will be hereinafter fully set forth.

For the purpose of illustrating my invention, I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

Referring to the drawings: Figure 1 represents a side elevation of the head part of a tool holder embodying my invention; Fig. 2 represents a sectional elevation on line 2—2 of Fig. 1; Fig. 3 represents an elevation of the opposite side of the holder from that shown in Fig. 1; Fig. 4 represents a side elevation partly in section of a portion of the clamping ring structure; Fig. 5 represents a section on line 5—5 of Fig. 4.

Similar numerals of reference indicate corresponding parts.

1 designates the tool holder shank which is adapted to fit the tool post of a lathe, planer or other machine, and is preferably provided with a clamping ring 2 formed integral therewith and of split construction, one portion of which is provided with a tubular boss 3 having its bore alined with a threaded socket 4 in the opposite portion, as will be understood. The boss 3 is adapted to receive the stud 5 which is adapted for threaded engagement with the socket 4 for the purpose of tightening or drawing the clamping ring firmly about the parts to be held thereby. The handle 6 provides means for operating the stud to either clamp or release the parts according to requirements. Attention is directed also to the fact that in the preferred embodiment of the invention the inner circumferential surface of the clamp has its side walls tapered or converging in the direction of the center of the clamping ring, as shown at 7, for a purpose which will later appear.

8 designates generally the holder and its adjuncts for mounting the tools, and consists preferably of a crown head 9 and an annular disk 10, which parts are adapted to be removably secured together and form between them a circumferential groove 11 adapted to receive the clamping ring 2. The head 9 has a centrally disposed bore or opening 12 extending longitudinally thereof, and also has its outer face suitably grooved to form a plurality of lugs or face abutments 13, the opposed faces of adjacent lugs being parallel to each other as indicated. The face of each lug is suitably tapped to receive a threaded stud 14, while the juxtaposed face of the next lug forms a bearing surface against which a suitable machine tool may be clamped by proper manipulation of the stud 14. This bearing surface of each lug is further preferably provided with an overhanging lip or flange 15 formed by a continuation of the outer face of the lug so that when a tool is clamped in position as indicated in Fig. 1, it is held against lateral displacement.

From the foregoing it will be seen that each tool is provided with an independent clamping means and may be removed or adjusted without disturbing the adjustment of the other tools. The locking of the tools in position is quickly and easily accomplished by feeding the stud outwardly with its head abutting the tool and forcing the latter tightly against the bearing surface of the next lug as will be readily apparent.

16 designates a tubular extension or hub formed integral with the head 9 and of reduced diameter to pass through the disk 10 and permit the latter to properly abut the neck 17 of the head and form the aforesaid channel or groove 11. It will be noted that the juxtaposed walls 18 and 19 of the respective parts 9 and 10 are beveled to converge toward the bottom of the groove 11 in order to conform to the tapered configuration of the clamping ring 2. The beveled walls 18 and 19 are so converged, however, as to provide a circumferential clearance space between the inner face of the ring 2 and the bottom of the groove, so that the ring has free clamping action while the contour of the groove causes accurate self-centering of the ring and results in a positive locking grip being obtained.

20 designates the head of a lock nut having a body part 21 which has threaded engagement with the hub 16 and also has free movement through the disk 10. In order to provide for the desired adjusting movement of the lock nut, I have preferably centered the disk 10 upon a circumferential shoulder 22 of the neck part 17, though it will be evident this construction may be variously modified. 23 designates a ratchet mounted to be clamped by the nut head 20 against the disk 10, while the latter part is simultaneously clamped by the same means against the neck 17, as will be understood. As a further means for preventing relative movement of one part with respect to another, I preferably provide a pin 38 extending transversely of the ratchet and into the body of the disk 10, while a similar pin 39 serves the same purpose between the disk 10 and the neck 17 of the head 9. Thus, it will be evident that should the lock nut 21 loosen or be improperly adjusted, the parts held thereby are still locked against relative turning movement.

Referring to Fig. 3, it will be seen that the ratchet teeth 24 are respectively drilled through and tapped to receive adjusting screws 25 for the purpose of forming adjustable abutments against which the pivoted locking pawl 26 is adapted to contact. These screws 25 preferably have split end portions so that the spring action acts to lock each screw in its adjusted position. This pawl, as here shown, is held by means of the spring 27 in proper locking position to prevent reverse turning movement of the ratchet during a cutting operation, though permitting free movement in one direction when the ring 2 is unclamped. Since each tooth of the ratchet is relatively arranged with respect to a cutting tool upon the opposite face of the head, it will be evident that when the pawl engages one of the teeth one of the cutting tools will be in position to engage the work, and its set may be varied relative to the work by adjusting the screw 25 for that tooth according to requirements. Thus, if it is required to raise the cutting tool in use relative to the work the adjusting screw in the ratchet which is abutting the pawl is fed outwardly as desired to increase the length of that ratchet tooth, and in consequence the pawl 26 will hold the head in a new angular position and raise the cutting tool in the desired manner.

The end of the hub 16 preferably projects beyond the lock nut and is suitably slotted to form a split gripping end 28 which serves as a means for clamping or locking a longitudinally disposed tool in the bore 12. The locking action is effected by tapering the outer end part of the hub, as shown at 29, to engage an internally tapered nut 30 which fits over the hub and has threaded engagement therewith, as will be apparent.

31 designates a socket formed in a lug 32 of the clamping ring 2 and preferably threaded to receive a two-part stay bolt, one part 33 of which is provided with a right hand thread while the opposite or head part 34 is provided with a left hand thread. The two parts of this bolt are connected by an internally threaded coupling or sleeve 35 which operates to move the head part 34 with respect to the opposite part so that the bolt may be either relatively long or short. The function of this construction is to provide a fixed, firm support for the end of the holder whereby vibration or chattering of the tool is eliminated. It will be understood that the head of the stay bolt is adapted to be placed in contact with a suitable fixed part of the lathe, planer or like machine when it may be adjusted as a relatively rigid stay to prevent improper movement of the holder.

The cutting tools are designated by the reference numerals 36, while 37 designates a tool adapted to be positioned in the bore of the holder, as will be understood.

In the operation of the device the two parts of the holder 9 and 10 are inserted from opposite sides of the ring clamp and fixed in position, together with the ratchet 23, by tightening the lock nut 21 since the pins 38 and 39 have already been driven into position, as will be understood. The cutting tools 36 are fixed in position in the respective grooves between the lugs, each being locked by feeding the set screw or stud outwardly to clamp the tool against the opposite wall of the adjacent lug. By this arrangement each tool is independently adjustable and controlled by a separate locking means, and furthermore the projecting lip upon each lug prevents any tendency of the tool to spring outwardly or become displaced during a cutting operation. The ring clamp 2 centers itself upon the beveled bearing and is properly adjusted to exert a positive gripping action upon the parts as soon as the proper tool has been set up with respect to the work, thereby effectually preventing rotation of the holder relative to the clamping ring during the machining step. An additional provision against turning movement consists in the ratchet which is controlled by the pawl 26, which parts are so arranged as to resist a turning movement imparted by the tool while employed in cutting.

In case it is desired to employ a boring bar or like device for internally machining a part, such implement may be inserted in the bore 12 of the head and locked in position by means of the nut 30.

In case it is necessary to change the set of the tool which is performing the machining operation, it may be done by loosening the clamping ring so that the head is free to turn, and then changing the adjustment of the screw 25 in the ratchet tooth corresponding to the tool in use. This action, of course, varies the point of contact of the pawl with the ratchet tooth, and therefore either lowers or raises the tool with respect to the work center.

When the device is correctly positioned for the machining operation the holder may be made substantially rigid by adjusting the stay bolt parts 33 and 34 in such a manner as to form a brace between the fixed part of the machine and the holder proper, whereby vibration or chattering of the tool is effectually prevented.

It will, of course, be understood that the shank 1 is adapted to be inserted in the tool post of a suitable machine without special equipment, and the entire device may therefore be readily attached or removed as desired.

In connection with the means for controlling the clamping ring, it will be noted that this is a direct clamping of the two parts of the ring without the interposition of any auxiliary devices, and therefore affords a positive and effective lock for producing the necessary gripping action to prevent movement of the holder.

Attention is directed to the provision of the circumferential groove 11 having the beveled walls, since the coöperating clamping member of the shank not only seats therein to lock the parts together, but is accurately centered so that the binding force is distributed to impart a uniform and even pressure. It will further be noted that by providing means for securing an additional tool in the holder, such as a boring bar, twist drill, die holder, reamer or the like, the field or range of the holder is materially increased, and the device therefore becomes adapted for substantially all machine operations. Consequently when the holder is set up with the required tools at least six different machining operations may be carried out successively without changing the holder or otherwise varying the adjustment of the machine to which it is attached.

While I have in the present instance shown the holder as adapted for five cutting tools mounted in the rotatable head and one tool carried axially of the device, it will be understood that this is only by way of example and the number of tools may be varied to suit requirements.

A further advantage of the device resides in the provision of means for minimizing vibration and chattering of the tool, such means as here shown comprising an adjustable stay bolt which forms a substantially rigid brace between the holder and a fixed part of the machine to which the holder is attached. While I have, in the present instance, illustrated the stay bolt as a two-part member, I do not wish to be limited to this construction, as obviously various equivalent means may be employed to form a brace for the end of the tool holder without departing from the spirit of my invention. Further, the holder is adapted for use with lathes, planers, shapers and like machines, and may be readily attached thereto without requiring special equipment of the machine, since the usual tool post is entirely satisfactory for the purpose. Since all of the tools are carried by the one holder it is evident that the device may be quickly removed from the machine when desired, and the latter is then ready for its ordinary work without readjustment. It will further be evident that the holder and its adjuncts are rotatable within the clamping ring when the latter is loosened, so that any one of the tools carried by the head may be brought into position for use, as will be understood.

It will now be apparent that I have devised a novel and useful construction which embodies the features of advantage enumerated as desirable in the statement of the invention and the above description, and while I have in the present instance shown and described the preferred embodiment thereof which has been found in practice to give satisfactory and reliable results, it is to be understood that the same is susceptible of modification in various particulars without departing from the spirit or scope of the invention as expressed in the claims or sacrificing any of its advantages.

Having now described my invention, what I claim as new and desire to protect by Letters Patent is:—

1. In a tool holder, the combination of a shank adapted to be removably secured to a machine, a clamping ring carried by said shank having internal circumferentially tapered surfaces, direct means for adjusting said ring, a holder having a bore therein and provided with a circumferential beveled seat forming a self-centering bearing for the tapered portion of said ring, and a head having means to independently support a plurality of tools.

2. In a tool holder, the combination of a shank adapted to be removably secured to a machine, a split ring formed integral with said shank and provided with a threaded socket at one side, and a bore in the opposite part alined with said socket, a threaded stud located in said bore and having threaded engagement with said socket, a holder provided with a beveled bearing adapted to receive said ring, a head having a plurality of lugs arranged in spaced relation for respectively seating a plurality of cutting tools, means to clamp each tool against an adjacent lug, and means to operate said stud to clamp said ring about said holder.

3. In a tool holder, the combination of a shank adapted to be removably secured to a machine, a clamping device carried by said shank, a holder having an axial bore therethrough and provided with a bearing to be engaged by said clamping device, a head provided with separate locking devices for a plurality of independent cutting tools, means to lock said clamping device to said holder, and means independent of said locking means for preventing relative movement between said holder and clamping device while a tool is in operation.

4. In a tool holder, the combination of a shank provided with clamping means, a head adapted to be fixed in a predetermined position by said clamping means, a plurality of lugs carried by one face of said head and arranged in spaced relation to form seats respectively adapted to seat a tool, each lug having a lip or flange projecting over a portion of the groove to provide an abutment contacting with one face of the tool to prevent lateral displacement thereof, studs respectively threaded into each lug and adapted to be fed outwardly to clamp the respective tools against the opposite wall of the adjacent lug, a ratchet fixed to said head having teeth corresponding in number to the number of tools to be carried by said head, and each tooth positioned relatively to the operative position of the respective tools, means to lock said head and ratchet against relative turning movement, a spring pressed pawl adapted to engage the ratchet tooth, and means between the pawl and each tooth for adjusting the angular position of said ratchet and said head whereby the set of the tool may be varied at will.

5. In a tool holder the combination of a head provided with means for supporting a plurality of tools, a shank having means for removably securing said head thereto and means, common to all of said tools and secured to said shank, for engaging a fixed part to prevent any of said tools from vibrating or chattering in use.

6. In a tool holder, the combination of a head provided with means for supporting a plurality of tools, a shank adapted to removably support said head, an extension formed on said shank, and means adjustably secured to said extension for engaging a fixed part to prevent vibration of any of said tools irrespective of which tool is in operation.

In testimony that I claim the foregoing invention, I hereunto set my hand this 9th day of April, 1915.

JOHN MARCH.

In the presence of—
ROBERT M. BARR,
FLORENCE DEACON.

Copies of this patent may be obtained for five cents each, by addressing the "Commissioner of Patents, Washington, D. C."